(12) United States Patent
Kato et al.

(10) Patent No.: US 8,983,780 B2
(45) Date of Patent: Mar. 17, 2015

(54) UNMANNED DRIFTING SUBSTANCE MONITORING BUOY, DRIFTING SUBSTANCE MONITORING SYSTEM, AND DRIFTING SUBSTANCE MONITORING METHOD

(75) Inventors: Naomi Kato, Suita (JP); Hidetaka Senga, Suita (JP); Hiroyoshi Suzuki, Suita (JP); Muneo Yoshie, Yokosuka (JP); Isamu Fujita, Yokosuka (JP); Yoshitaka Matsuzaki, Yokosuka (JP); Toshinari Tanaka, Yokosuka (JP)

(73) Assignee: Osaka University, Osaka (JP)

( * ) Notice: Subject to any disclaimer, the term of this patent is extended or adjusted under 35 U.S.C. 154(b) by 534 days.

(21) Appl. No.: 13/391,272

(22) PCT Filed: Aug. 11, 2010

(86) PCT No.: PCT/JP2010/063627
§ 371 (c)(1),
(2), (4) Date: Feb. 17, 2012

(87) PCT Pub. No.: WO2011/021552
PCT Pub. Date: Feb. 24, 2011

(65) Prior Publication Data
US 2012/0158303 A1 Jun. 21, 2012

(30) Foreign Application Priority Data
Aug. 20, 2009 (JP) .................. 2009-191156

(51) Int. Cl.
*G01W 1/00* (2006.01)
*B63B 35/00* (2006.01)
(Continued)

(52) U.S. Cl.
CPC ............... *B63B 35/00* (2013.01); *B63B 22/18* (2013.01); *B63B 2035/007* (2013.01); *B63H 9/06* (2013.01); *G01C 13/00* (2013.01)
USPC ............... 702/3; 702/182; 702/183; 702/188

(58) Field of Classification Search
CPC ........................ G01C 13/00; G01F 23/0023
USPC .............................. 702/3, 182–188
See application file for complete search history.

(56) References Cited

U.S. PATENT DOCUMENTS

| 5,520,136 A | 5/1996 | Yamaguchi et al. |
| 2006/0058929 A1* | 3/2006 | Fossen et al. ............... 701/21 |
| 2012/0158303 A1* | 6/2012 | Kato et al. ............... 702/3 |

FOREIGN PATENT DOCUMENTS

| JP | 7-55911 A | 3/1995 |
| JP | 7-226984 A | 8/1995 |

(Continued)

OTHER PUBLICATIONS

International Search Report received for PCT Patent Application No. PCT/JP2010/063627, mailed on Nov. 16, 2010, 3 pages (1 page of English Translation and 2 pages of PCT Search Report).

(Continued)

*Primary Examiner* — Phuong Huynh
(74) *Attorney, Agent, or Firm* — Morrison & Foerster LLP

(57) ABSTRACT

An unmanned drifting substance monitoring buoy (10) is thrown into a water area where a drifting substance is present, thereby tracking and monitoring the drifting substance. The unmanned drifting substance monitoring buoy (10) detects, by a detecting section, a relative location of the drifting substance on the water surface with respect to the unmanned drifting substance monitoring buoy (10), and measures, by a measuring section, directions and strengths of a wind and a tidal current. Then, the unmanned drifting substance monitoring buoy (10) tracks the drifting substance by adjusting, based on the relative location of the drifting substance detected by the detecting section and on the directions and the strengths of the wind and the tidal current measured by the measuring section, a surface area and a direction of a sail (13) by an adjusting section. This achieves an unmanned drifting substance monitoring buoy capable of tracking a drifting substance with small energy even when not only a tidal current but also a flow caused by a wind at the sea surface is large.

5 Claims, 5 Drawing Sheets

(51) Int. Cl.
  *B63B 22/18* (2006.01)
  *B63H 9/06* (2006.01)
  *G01C 13/00* (2006.01)
  *G06F 11/30* (2006.01)

(56) References Cited

FOREIGN PATENT DOCUMENTS

| JP | 11-18615 A | 1/1999 |
| JP | 11-18645 A | 1/1999 |
| JP | 2000-25688 A | 1/2000 |
| JP | 2008-49942 A | 3/2008 |
| JP | 2008-100536 | 5/2008 |

OTHER PUBLICATIONS

Office Action received for Japanese Patent Application No. 2011-527650, mailed on Aug. 20, 2013, 6 pages (4 pages of English Translation and 2 pages of Office Action).

* cited by examiner

UNMANNED DRIFTING SUBSTANCE MONITORING BUOY, DRIFTING SUBSTANCE MONITORING SYSTEM, AND DRIFTING SUBSTANCE MONITORING METHOD

CROSS REFERENCE TO RELATED APPLICATIONS

This application is a U.S. National Phase patent application of PCT/JP2010/063627, filed Aug. 11, 2010, which claims priority to Japanese patent application Serial No. 2009-191156, filed Aug. 20, 2009, all of which are hereby incorporated by reference in the present disclosure in their entirety.

TECHNICAL FIELD

The present invention relates to an unmanned drifting substance monitoring buoy for discovering and monitoring a drifting substance such as heavy oil drifting or floating on the sea as a result of spill from a shipwreck etc.

BACKGROUND ART

Heavy oil spilled on the sea as a result of shipwreck of an oil tanker etc. gets emulsified when mixed with seawater, and so acquires high degree of viscosity and remains long. If drifting ashore, the heavy oil is likely to cause enormous damage to the environment, and it takes a considerable amount of time and effort for the recovery, causing significant harm to the local economy.

Therefore, in order to minimize the damage to the environment, it is necessary to place, prior to the arrival of the spilled heavy oil at the coast, heavy oil collection equipment and oil control equipment mainly on the coast where the heavy oil is expected to drift ashore, thereby efficiently collecting the heavy oil when it drifts ashore. For that purpose, once the drifting heavy oil (floating heavy oil) is discovered, it is necessary to precisely calculate where the heavy oil will drift by running a highly precise simulation of drifting heavy oil. In order to increase the precision of the simulation, it is important to obtain a real-time location of the drifting heavy oil and oceanographic/meteorological data on the area where the heavy oil drifts, allowing the simulation to reflect such data.

As a way of discovering and monitoring a drifting substance such as drifting heavy oil and chemicals, there is a method called a fluorescence LIDAR method. When employing this method, an ultraviolet laser radar (LIDAR: Light Detection and Ranging) device is mounted on a helicopter so as to scan, from the air, the area where the substance was spilled. During this scanning, an ultraviolet pulsed laser is radiated from the laser radar device on the helicopter towards the sea surface, and the fluorescence generated at the sea surface by the radiation is photographed with respect to four different types of wavelengths by an ultrasensitive camera which is mounted on the helicopter and constituted by image intensifier tubes and a CCD camera. The information about the location of the seawater and the spilled oil is obtained from the photographed images by distinguishing between violet-blue water raman light of the seawater and blue-green fluorescence of the oil etc. It should be noted that the results of the past testing observations of spilled oil show that spilled oil whose diameter on the water surface is 15 m can be detected in the viewing field of 100 mrad when observed from 150 m in height.

This fluorescence LIDAR method, being an active system to generate fluorescence by laser excitation, makes it possible to conduct night-time observations as well as daytime observations, and to identify a spilled substance by a fluorescent spectrum. Also, because the fluorescence LIDAR method uses a CCD camera as a base for light reception, a real-time observation is possible.

However, this method causes such a problem that it is difficult to continue tracking the spill for an extended period of time because of the limited endurance of a helicopter. Therefore, the inventors of the present application have proposed a drifting substance monitoring method using an unmanned drifting substance monitoring buoy (refer to Patent Literature 1).

The unmanned drifting substance monitoring buoy in Patent Literature 1 is thrown into a water area of a drifting substance, and automatically repeats surfacing and submerging in the water area. The unmanned drifting substance monitoring buoy detects, when under the water, presence/absence of the drifting substance at the water surface and the location of the drifting substance. Thereafter, the unmanned drifting substance monitoring buoy surfaces towards the location of the drifting substance thus detected, and transmits, while afloat in the area of the drifting substance at the water surface, location information and oceanographic/meteorological data to a base station.

The unmanned drifting substance monitoring buoy surfaces or submerges by having water enter in or exit from a cylinder inside thereof. Also, when surfacing, the unmanned drifting substance monitoring buoy moves itself towards the location of the detected drifting substance by adjusting its moveable wings. That is, the movement of the unmanned drifting substance monitoring buoy towards the drifting substance is made by a surfacing force, and a direction of the movement is decided only by adjusting the moveable wings. Therefore, the unmanned drifting substance monitoring buoy reduces energy consumption for tracking the drifting substance, and makes it possible to track the drifting substance for an extended period of time (from several days to several weeks), compared to the case of utilizing a propulsion device such as a propeller for tracking a drifting substance.

CITATION LIST

Patent Literature 1
Japanese Patent Application Publication, Tokukai, No. 2008-100536 (Publication Date: May 1, 2008)

SUMMARY OF INVENTION

Technical Problem

Because the unmanned drifting substance monitoring buoy in Patent Literature 1 makes its movement for tracking a drifting substance only by adjusting the moveable wings while surfacing, a moving distance is limited. On the other hand, a drifting substance on the sea surface flows along the vector sum of (i) a sea surface current of a tidal current and (ii) a flow caused by the friction between the sea surface and a wind on the sea surface.

The sea surface current of the tidal current does not significantly affect the tracking motion of the unmanned drifting substance monitoring buoy, because the surface current effects on the drifting substance and on the unmanned drifting substance monitoring buoy both in the same manner. However, it is conceivable that the wind at the sea surface affect the tracking motion of the unmanned drifting substance monitoring buoy.

Specifically, when the unmanned drifting substance monitoring buoy is under the water, the wind at the sea surface does not have the effects on the buoy but on the drifting substance only. In addition, even when the unmanned drifting substance monitoring buoy is on the water surface, the wind at the sea surface does not have significant effects on the buoy, but has remarkable effects on the drifting substance. This is because the drifting substance's surface area in comparison to its cubic measure is large, while the buoy's surface area in comparison to its cubic measure is small.

Therefore, such a problem arises that it is difficult to track a drifting substance by utilizing the unmanned drifting substance monitoring buoy of Patent Literature 1 in a case where a wind at the sea surface is strong, and a flow caused by the friction between the wind and the sea surface is large.

The present invention is invented in view of the above problem, and its object is to achieve an unmanned drifting substance monitoring buoy capable of tracking a drifting substance with small energy even in a case where there is high pressure from not only a tidal current but also a flow caused by a wind at the sea surface.

Solution to Problem

In order to solve the above problem, the present invention is an unmanned drifting substance monitoring buoy that is thrown into a water area where a drifting substance is present and that tracks and monitors the drifting substance, the unmanned drifting substance monitoring buoy including: a detecting section that detects a relative location of the drifting substance on a water surface with respect to the unmanned drifting substance monitoring buoy; a measuring section that measures directions and strengths of a wind and a tidal current; a sail whose surface area and direction are adjustable; and an adjusting section that adjusts the surface area and the direction of the sail, based on the relative location of the drifting substance detected by the detecting section and on the directions and the strengths of the wind and the tidal current measured by the measuring section.

With the above configuration, the unmanned drifting substance monitoring buoy adjusts the surface area and the direction of the sail, based on data of the relative location of the drifting substance and on measured data of the wind and the tidal current. Hence, energy consumption for tracking the drifting substance can be reduced, compared to the case of tracking the drifting substance by utilizing a propulsion device such as a propeller. This makes it possible to track the drifting substance for an extended period of time, and to perform automatic tracking of the drifting substance for over a few days to a few weeks. In addition, even in a case where there is high pressure from not only a tidal current but also a flow caused by a wind at the sea surface, high tracking performance can be obtained.

Further, an unmanned drifting substance monitoring system of the present invention utilizes the unmanned drifting substance monitoring buoy. This configuration makes it possible to obtain, by utilizing a relatively simple system and devices such as the unmanned drifting substance monitoring buoy and a receiving device at a base station, the location of the drifting substance and oceanographic/meteorological data at the water area.

Besides, in order to solve the above problem, a drifting substance monitoring method of the present invention is a drifting substance monitoring method for throwing an unmanned drifting substance monitoring buoy into a water area where a drifting substance is present and tracking and monitoring the drifting substance by the unmanned drifting substance monitoring buoy, the drifting substance monitoring method including the steps of: detecting a relative location of the drifting substance on a water surface with respect to the unmanned drifting substance monitoring buoy; measuring directions and strengths of a wind and a tidal current; controlling the unmanned drifting substance monitoring buoy so as to track and follow the drifting substance by adjusting, based on the relative location of the drifting substance thus detected and on the directions and the strengths of the wind and the tidal current thus measured, a surface area and a direction of a sail provided on the unmanned drifting substance monitoring buoy; and transmitting oceanographic/meteorological data measured by the unmanned drifting substance monitoring buoy to a base station.

By employing the above drifting substance monitoring method, the same effect produced by the unmanned drifting substance monitoring buoy and the drifting substance monitoring system can be produced.

Advantageous Effects of Invention

Since an unmanned drifting substance monitoring buoy of the present invention adjusts a surface area and a direction of a sail and controls its tracking motion, based on data of a relative location of a drifting substance and on measured data of a wind and a tidal current, the energy consumption for tracking the drifting substance can be reduced. This makes it possible to track the drifting substance for an extended period of time, and to perform automatic tracking of the drifting substance for over a few days to a few weeks. In addition, even in a case where there is high pressure from a flow caused by a wind at the sea surface, high tracking performance can be obtained.

DESCRIPTION OF EMBODIMENTS

Figure 1:
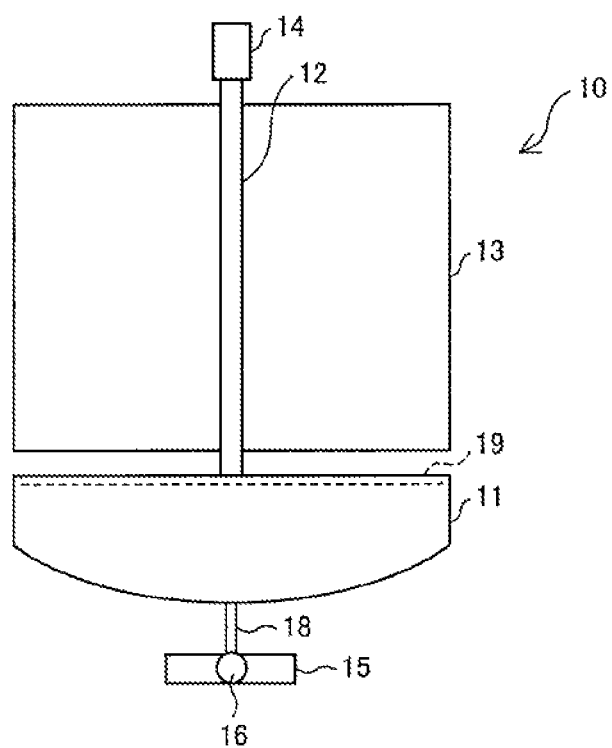
FIG. 1(a) is an elevation view showing an unmanned drifting substance monitoring buoy in accordance with one embodiment of the present invention.
FIG. 1(b) is a side view showing an unmanned drifting substance monitoring buoy in accordance with one embodiment of the present invention.
Figure 1:
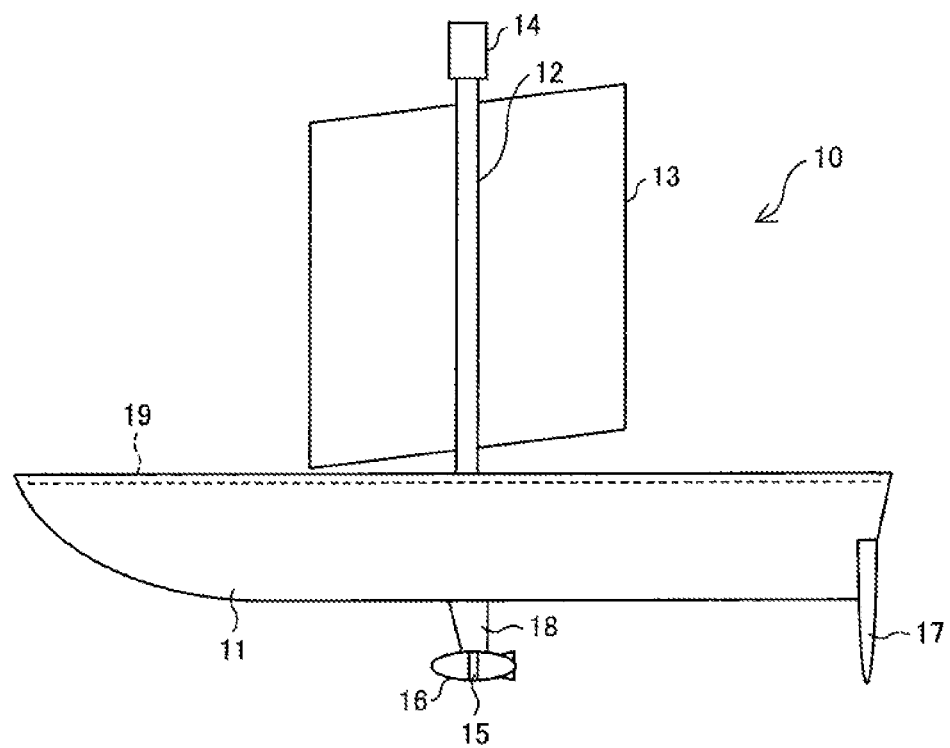

An unmanned drifting substance monitoring buoy according to the present invention is described below with reference to the drawings. Although heavy oil appears in this description as a drifting substance, the present invention is applicable to other drifting substances.

An unmanned drifting substance monitoring buoy 10 as shown in FIGS. 1(a) and 1(b) show an embodiment of the present invention, and illustrates, as an example, a yacht-like shaped buoy including a buoy main body section 11 which is shaped like a hull of a yacht. FIG. 1(a) is an elevation view of the buoy, and FIG. 1(b) is a side view of the buoy. The unmanned drifting substance monitoring buoy 10 is thrown into a water area where drifting heavy oil is present, and can detect presence/absence of the drifting heavy oil and its location while staying afloat in the water area, and can track the drifting heavy oil thus detected and move accordingly. Also, the unmanned drifting substance monitoring buoy 10 is configured to collect location information and oceanographic/meteorological data etc., and to transmit the data to a base station. It is desirable that a communication device for transmitting the information obtained by the unmanned drifting substance monitoring buoy 10 to a ground station be a one which transmits the information to the ground station through a satellite.

The unmanned drifting substance monitoring buoy 10 as shown in FIGS. 1(a) and 1(b) includes a mast 12, a sail 13, and a drifting substance monitoring sensor 14 which are positioned on the upper side of the buoy main body section 11. A surface area and a direction of the sail 12 can be adjusted by a controlling section, which is not illustrated. Also, the drifting substance monitoring sensor 14 is attached to the top of the mast 12.

The drifting substance monitoring sensor 14 is, for example, an ultraviolet sensor for detecting the distribution range of the drifting heavy oil by utilizing the fluorescence LIDAR method. The drifting substance monitoring sensor 14 radiates ultraviolet from the top of the mast 12 towards the water surface, scans a predetermined range of the water area, and catches fluorescence reflected back from the water surface and from the drifting heavy oil. Then, the drifting substance monitoring sensor 14 distinguishes between the water surface and the area of the drifting heavy oil by analyzing the fluorescence.

In the case of utilizing the fluorescence LIDAR method with the drifting substance monitoring sensor 14, the method may be carried out in such a manner as to detect a fluorescent spot of spilled oil resulting from purple laser excitation by a small-sized sensor placed within 2 m above the water surface. Additionally, although the drifting substance monitoring sensor 14 can scan all around the unmanned drifting substance monitoring buoy with the ultraviolet radiated from the drifting substance monitoring sensor 14 itself, the drifting substance monitoring sensor 14 can also be configured to radiate the ultraviolet in a plurality of specified directions (such as four directions of backward, forward, rightward, and leftward). The configuration to radiate the ultraviolet only in the plurality of specified directions does not require a scanning device, thereby contributing to downsizing of the buoy and to reduction in power consumption.

The way to control the surface area and the direction of the sail 13 includes, but not particularly limited to, for example, controlling the surface area by rolling up the sail 13 and controlling the direction of the sail 13 by turning the mast 12 around.

In addition, although not illustrated, the drifting substance monitoring sensor 14 includes (i) a GPS device for detecting the location of the buoy, (ii) various measuring devices such as a tidal current meter, a wave gauge, and an anemoscope/anemometer for monitoring oceanographic/meteorological data, and (iii) a transmission device etc. for transmitting various data to the base station. These various devices are also controlled by the unillustrated controlling section.

The unmanned drifting substance monitoring buoy 10 as shown in FIG. 1 includes, on the bottom side of the buoy main body section 11, a brake plate 15, a thruster 16, and a rudder 17. The brake plate 15 and the thruster 16 are provided on the bottom of the buoy main body section 11 via the keel 18.

The brake plate 15 is provided on an underwater part of the unmanned drifting substance monitoring buoy 10 in order to counteract a propelling force of the wind resistance that is applied to the structure above the water level of the buoy. Specifically, the brake plate 15 serves as a resistance when the unmanned drifting substance monitoring buoy 10 receives the propelling force from the sail 13, thereby adjusting velocity of the buoy. The thruster 16 can, if provided as a means of extensively moving the buoy in emergency, increase the tracking ability of the unmanned drifting substance monitoring buoy 10 when the buoy is left far behind the drifting heavy oil. The unmanned drifting substance monitoring buoy 10 can precisely adjust its moving direction by utilizing the rudder 17, thereby also enhancing its tracking ability. The thruster 16 and the rudder 17 are also controlled by the unillustrated controlling section.

Further, although not illustrated, an actuator for controlling the rudder 17, an attitude control sensor, and a battery etc. are also installed inside the buoy main body section 11. Besides, by providing the buoy with a solar panel, a wave activated generation device etc. so that the battery gets charged during daylight and while the buoy stays afloat on the waves, it is possible to significantly extend the period of operation. FIG. 1 illustrates, as an example, the configuration of the unmanned drifting substance monitoring buoy 10 designed such that a solar panel 19 is provided on the upper side of the buoy main body section 11.

In addition, a drifting substance monitoring system is configured by utilizing the unmanned drifting substance monitoring buoy 10. In this case, although a base station receiving a transmission from the unmanned drifting substance monitoring buoy 10 is normally placed on the land as a ground station, the base station can also be placed on a helicopter, an airplane, and a vessel etc. if necessary. It is also possible to have a plurality of base stations receive the transmission as well. Besides, this drifting substance monitoring system is, in order to throw the unmanned drifting substance monitoring buoy 10 in the water area of the drifting substance, configured to include equipment and a subsystem for discovering the water area, throwing the unmanned drifting substance monitoring buoy 10 in the water area, and retrieving the unmanned drifting substance monitoring buoy 10 from the water area.

Next, the following describes a method for controlling the unmanned drifting substance monitoring buoy 10 and a drifting substance monitoring method utilizing the unmanned drifting substance monitoring buoy 10.

Figure 2:
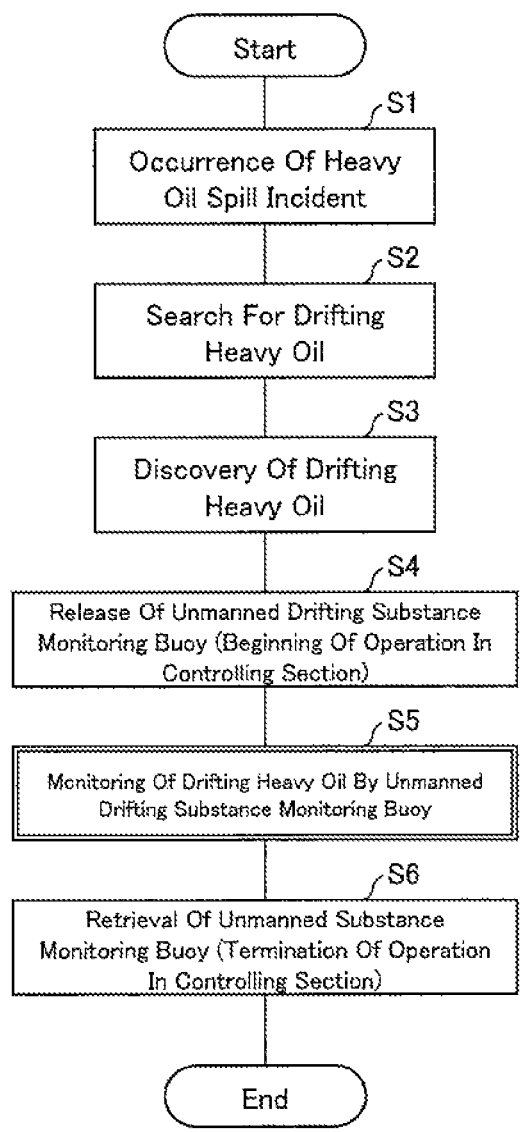
FIG. 2 is a flow chart that shows a drifting substance monitoring method utilizing the unmanned drifting substance monitoring buoy.

As shown in FIG. 2, when a heavy oil spill incident occurs (S1), a search of the heavy oil is conducted with an airplane, a helicopter, and a vessel etc. (S2), and when the heavy oil is discovered (S3), the unmanned drifting substance monitoring buoy 10 is released from the airplane, the helicopter, and the vessel etc. into the midst of the drifting heavy oil or nearby (S4). At the time of this release, the unmanned drifting substance monitoring buoy 10 is switched on so that the controlling section starts the controlling motion, and thus the unmanned drifting substance monitoring buoy 10 starts its operation. Thereafter, monitoring of the drifting heavy oil by the unmanned drifting substance monitoring buoy is conducted, and the unmanned drifting substance monitoring buoy 10 tracks the drift of the drifting heavy oil and transmits various data to a base station (S5). When the unmanned drifting substance monitoring buoy 10 is no longer needed upon completion of a necessary treatment such as collection of the drifting heavy oil etc., the unmanned drifting substance monitoring buoy 10 is retrieved and turned off to halt the controlling motion of the controlling section, thereby halting the operation (S6).

Figure 3:
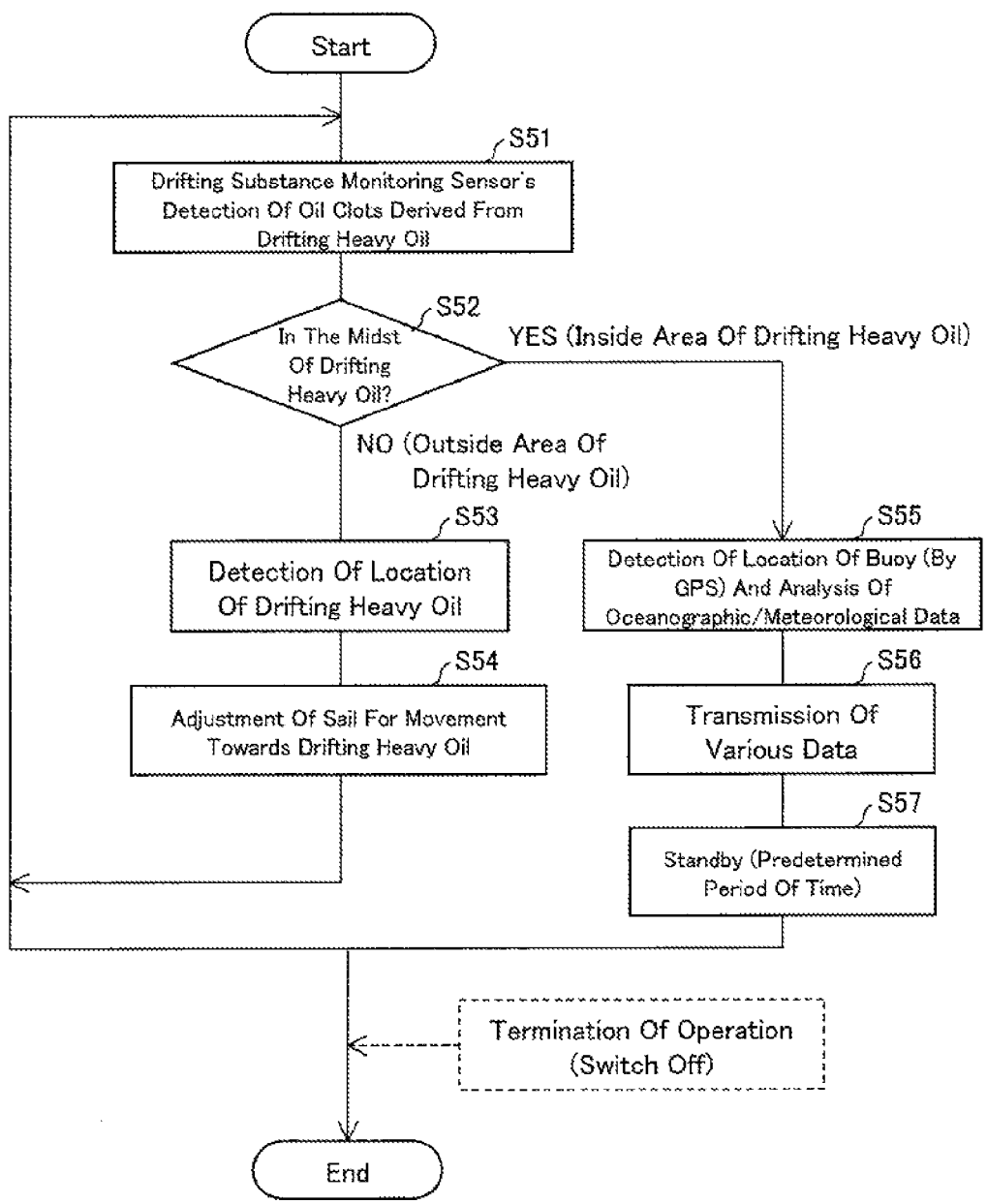
FIG. 3 is a flow chart that shows control, during monitoring of drifting heavy oil by the unmanned drifting substance monitoring buoy, of automatic tracking of drifting heavy oil and of data communication by the unmanned drifting substance monitoring buoy.

In addition, the automatic tracking of the drift of the drifting heavy oil and data communication conducted by the unmanned drifting substance monitoring buoy 10 in the step of "monitoring of drifting heavy oil by the unmanned drifting substance monitoring buoy" (S5) is conducted in an automatically controlled manner according to a control flow as shown in FIG. 3.

When the controlling section of the unmanned drifting substance monitoring buoy 10 is turned on so as to begin the controlling motion according to the control flow as shown in FIG. 3, the drifting substance monitoring sensor 14 in the unmanned drifting substance monitoring buoy 10 scans the water surface around the buoy and detects oil clots derived from the drifting oil (S51).

Upon completion of the detecting operation in S51, the drifting substance monitoring sensor 14 judges, according to the detection result, whether the unmanned drifting substance monitoring buoy 10 is in the midst of the drifting heavy oil (S52). Specifically, during the detecting operation in S51, the drifting substance monitoring sensor 14 scans all the directions around the buoy. In a case where the oil clots are detected all around the buoy as a result, the drifting substance monitoring sensor 14 decides that the drifting substance monitoring buoy 10 is in the midst of the drifting heavy oil. On the other hand, in a case where the oil clots are partially detected around the buoy and not all around the buoy, the drifting substance monitoring sensor 14 decides that the drifting substance monitoring buoy 10 is not in the midst of the drifting heavy oil. This judging process is conducted to ensure the apprehension of the situation because there is a possibility that the unmanned drifting substance monitoring buoy 10 is placed outside the drifting heavy oil when thrown into the water, or strays from the drifting heavy oil because of disturbance such as waves, winds, and tidal currents etc. even when in the midst of the drifting heavy oil at first.

When the result indicates that the buoy is in the midst of the drifting substance, the control flow moves to S55, and when the result indicates otherwise, the control flow moves to S53.

In the case where the drifting substance monitoring buoy 10 is not in the midst of the drifting substance, the location of the drifting heavy oil on the water surface with respect to the drifting substance monitoring buoy 10 (relative location) is detected in S53. This detection is made possible by analyzing detection data acquired in S51 mentioned above.

Upon completion of the detection of the location of the drifting heavy oil on the water surface, the direction and the surface area of the sail 12 and the direction of the rudder 17 are adjusted in such a manner as to move the unmanned drifting substance monitoring buoy 10 towards the detected location of the drifting heavy oil. For the above adjustment, the data (directions and strengths of a tidal current and a wind) measured by the tidal current meter and the anemoscope/anemometer mounted on the unmanned drifting substance monitoring buoy 10 can be utilized. That is, the surface area of the sail 12 is enlarged to obtain the moving and propelling force from the wind, and the directions of the sail 12 and the rudder 17 are adjusted to move the unmanned drifting substance monitoring buoy 10 in the direction towards the drifting heavy oil (S54). The above adjustment can be easily automated by using an LUT (Look Up Table) to which the relative location of the drifting heavy oil and the measured data of the wind and the tidal current are inputted as parameters and from which the amounts of controlling the sail 12 and the rudder 17 which correspond to the input parameters are outputted.

It should be noted that, in the unmanned drifting substance monitoring buoy 10, the anemoscope/anemometer are provided on the mast 12, and the tidal current meter (for measuring the relative direction and velocity of the tidal current with respect to the buoy) are provided at an underwater part of the buoy. Since the unmanned drifting substance monitoring buoy 10 moves on the sea surface, the measures directly obtained from the anemoscope/anemometer and the tidal current meter are relative data to the buoy. However, since the buoy can be located by utilizing the GPS, such measures as described above can be corrected based on the information about the buoy's location, thus making it possible to measure the absolute velocity and directions of the wind and the tidal current.

As described above, since the control of the tracking motion by the sail and the rudder does not require a propulsion device such as a propeller, the power consumption for moving the buoy can be reduced. Nevertheless, in a case where the unmanned drifting substance monitoring buoy 10 includes, as shown in FIG. 1, the thruster 16 as a means of extensive moving in emergency, the unmanned drifting substance monitoring buoy 10 may operate the thruster 16 in S54 when the unmanned drifting substance monitoring buoy 10 is far behind the drifting substance by more than a predetermined distance.

Subsequent to the motion in S54 followed by a predetermined period of time passed, the control flow goes back to S51, and whether the unmanned drifting substance monitoring buoy 10 is in the midst of the drifting heavy oil is again judged through the operations of S51-S52. The operations of S51-S54 are thus repeated until the unmanned drifting substance monitoring buoy 10 reaches the drifting heavy oil.

On the other hand, in the case where the unmanned drifting substance monitoring buoy 10 is in the midst of the drifting heavy oil, the location of the unmanned drifting substance monitoring buoy 10 is detected by the GPS device, and the oceanographic/meteorological data is measured by the various measuring devices for monitoring oceanographic/meteorological data in S55. Then, the location information and the oceanographic/meteorological data are transmitted to the base station (S56). Thereafter, the buoy stands by until a predetermined period of time passes (S57), and then the control flow goes back to S51. Since the buoy stays afloat during this stand-by period, the buoy can be configured to charge the battery with a solar panel and a wave activated generation device during the stand-by period.

The control flow from S51 through S57 as shown in FIG. 3 is repeated until the unmanned drifting substance monitoring buoy 10 is retrieved. Upon completion of the operation by the unmanned drifting substance monitoring buoy 10 getting retrieved and the switch getting turned off, the automatic controlling motion gets terminated.

Figure 4:
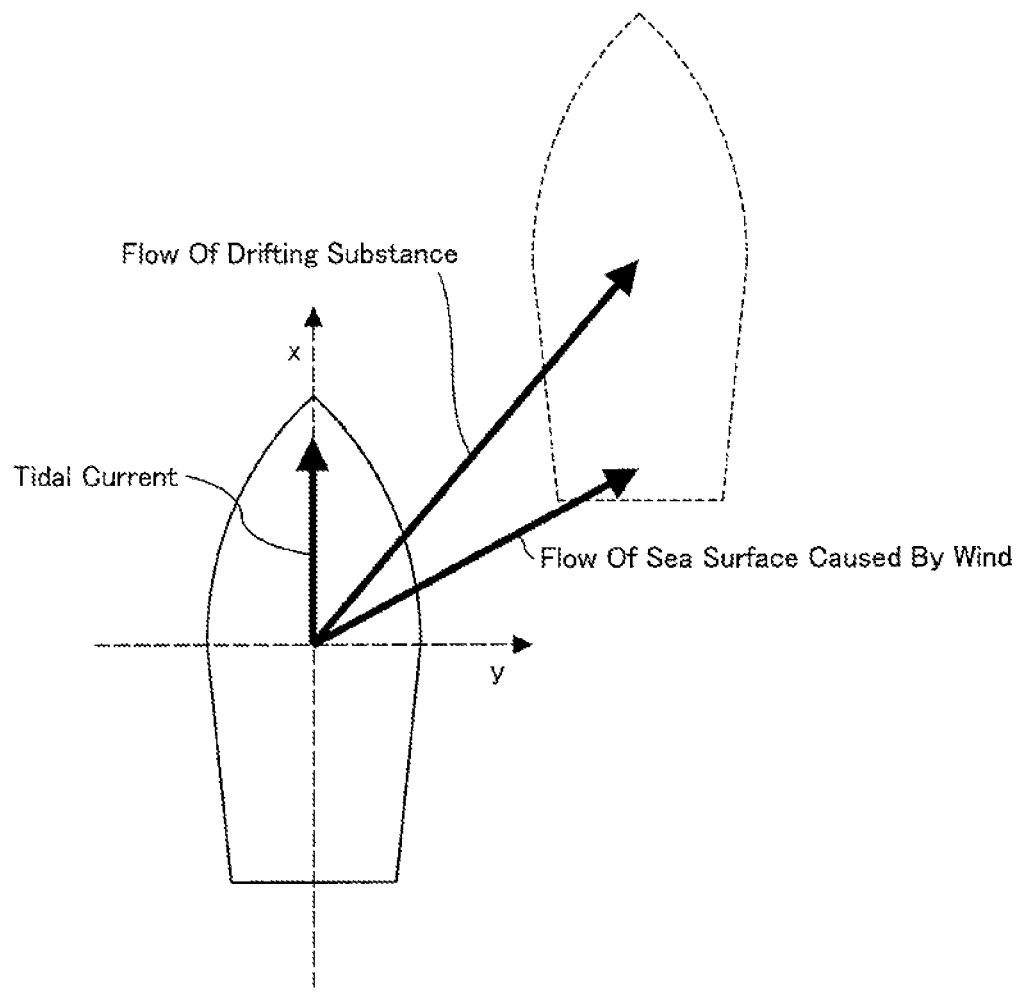
FIG. 4 is an explanatory view showing a moving direction of an unmanned drifting substance monitoring buoy.

It should be noted that, in the flow in FIG. 3, the adjustment of the sail 12 and the rudder 17 is made in the case where the unmanned drifting substance monitoring buoy 10 is not in the midst of the drifting heavy oil. However, the adjustment of the sail 12 and the rudder 17 may be made while the unmanned drifting substance monitoring buoy 10 is in the midst of the drifting heavy oil. That is, as shown in FIG. 4, if the unmanned drifting substance monitoring buoy 10 is configured to always adjust the sail 12 and the rudder 17 so as to move in the direction towards the vector sum of the flow of the sea surface by the wind and the flow of the tidal current, the unmanned drifting substance monitoring buoy 10 is less likely to stray away from the drifting heavy oil.

For example, it is conceivable that the unmanned drifting substance monitoring buoy 10 is provided with a GPS, an aerovane, and a bidirectional flow velocity sensor, and that the adjustment of the sail (surface area and direction) is made in such a manner as to move the buoy in the direction towards the vector sum of the tidal current and 3 percent of the wind (based on 10 m in height from the sea surface). Such an automatic controlling technology for adjusting the sail is similar to the automatic sailing technology for use in yachting. However, the basic difference between the present automatic controlling technology and the automatic sailing technology for use in yachting is that the present automatic controlling technology simultaneously adjusts the sail while detecting the heavy oil around the buoy by an oil detection sensor.

Figure 5A:
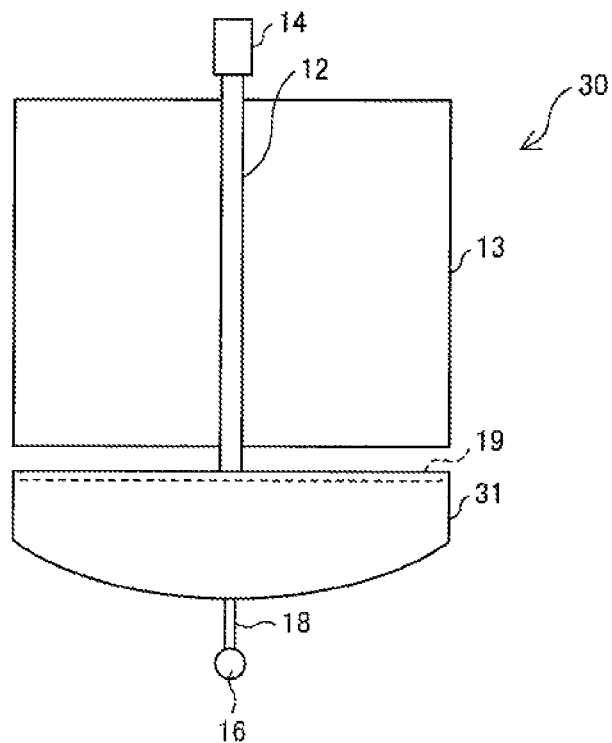
FIG. 5(a) is an elevation view showing an unmanned drifting substance monitoring buoy in accordance with one embodiment of the present invention.
Figure 5B:
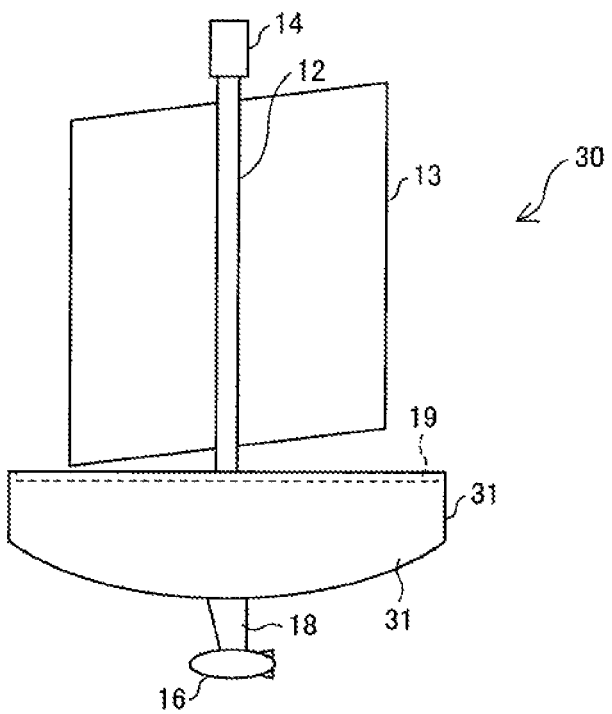
FIG. 5(b) is a side view showing an unmanned drifting substance monitoring buoy in accordance with one embodiment of the present invention.

Although the unmanned drifting substance monitoring buoy 10 as shown in FIGS. 1(a) and 1(b) illustrates a yacht-like shaped buoy as an example, the present invention is not limited to such an example, and the shape of the buoy's main body is not particularly limited. As shown in FIGS. 5(a) and 5(b), for example, the shape of a buoy's main body can be a circular form so as to constitute a circular-shaped buoy. FIG. 5(a) is an elevation view of the buoy, and FIG. 5(b) is a side view of the buoy.

An unmanned drifting substance monitoring buoy 30 as shown in FIGS. 5(a) and 5(b) has a circular-shaped buoy main body section 31 instead of the yacht-like shaped buoy main body section 11 in FIGS. 1(a) and 5(b). Besides, although the brake plate 15 and the rudder 17 as shown in FIGS. 1(a) and 1(b) are omitted from FIG. 5, the rest of the configuration of the unmanned drifting substance monitoring buoy 30 is the same as that of the unmanned drifting substance monitoring buoy 10 as shown in FIGS. 1(a) and 1(b). The unmanned drifting substance monitoring buoy without the rudder controls the tracking of a drifting substance by merely adjusting the surface area and the direction of a sail.

With the above unmanned drifting substance monitoring buoy, the drifting substance monitoring system, and the drifting substance monitoring method, automatic tracking of heavy oil can be conducted by automatically detecting the heavy oil with ultraviolet radiation and automatically moving the buoy in the direction towards the heavy oil thus detected.

Further, since movement of the buoy is performed by utilizing the sail 13 provided on the unmanned drifting substance monitoring buoy 10, power consumption for automatic tracking can be reduced, compared to an apparatus that moves by utilizing a propulsion device such as a propeller provided in the apparatus itself. This makes it possible to obtain, at a base station, real-time data on the location of the drifting heavy oil and on oceanographic/meteorological conditions in the water area of the drifting heavy oil for such an extended period of time as over approximately twenty days from the point immediately following the oil spill.

As described above, the present invention is an unmanned drifting substance monitoring buoy that is thrown into a water area where a drifting substance is present and that tracks and monitors the drifting substance, the unmanned drifting substance monitoring buoy including: a detecting section that detects a relative location of the drifting substance on a water surface with respect to the unmanned drifting substance monitoring buoy; a measuring section that measures directions and strengths of a wind and a tidal current; a sail whose surface area and direction are adjustable; and an adjusting section that adjusts the surface area and the direction of the sail, based on the relative location of the drifting substance detected by the detecting section and on the directions and the strengths of the wind and the tidal current measured by the measuring section.

Further, a drifting substance monitoring system of the present invention utilizes the unmanned drifting substance monitoring buoy.

Further, a drifting substance monitoring method of the present invention is a drifting substance monitoring method for throwing an unmanned drifting substance monitoring buoy into a water area where a drifting substance is present and tracking and monitoring the drifting substance by the unmanned drifting substance monitoring buoy, the drifting substance monitoring method including the steps of: detecting a relative location of the drifting substance on a water surface with respect to the unmanned drifting substance monitoring buoy; measuring directions and strengths of a wind and a tidal current; controlling the unmanned drifting substance monitoring buoy so as to track and follow the drifting substance by adjusting, based on the relative location of the drifting substance thus detected and on the directions and the strengths of the wind and the tidal current thus measured, a surface area and a direction of a sail provided on the unmanned drifting substance monitoring buoy; and transmitting oceanographic/meteorological data measured by the unmanned drifting substance monitoring buoy to a base station.

With the above configuration, the unmanned drifting substance monitoring buoy adjusts the surface area and the direction of the sail, based on data of the relative location of the drifting substance and on measured data of the wind and the tidal current. Hence, the energy consumption for tracking the drifting substance can be reduced, compared to the case of tracking the drifting substance by utilizing a propulsion device such as a propeller. This makes it possible to track the drifting substance for an extended period of time, and to conduct automatic tracking of the drifting substance for over a few days to a few weeks. In addition, even in a case where there is high pressure from not only a tidal current but also a flow caused by a wind at the sea surface, high tracking performance can be obtained.

Further, the unmanned drifting substance monitoring buoy is arranged such that oceanographic/meteorological data is analyzed, and the oceanographic/meteorological data thus analyzed is transmitted to a base station. The above configuration makes it possible to enhance the precision in a simulation of how a drifting substance drifts by obtaining (i) a location of a drifting substance and (ii) oceanographic/meteorological data such as data on waves, a tidal current, a wind, and barometric pressure in the water area around the location.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The present invention can achieve tracking and monitoring of a drifting substance by an unmanned drifting substance monitoring buoy with low power consumption and high tracking performance, and can be used in a drifting substance monitoring system that tracks and monitors drifting heavy oil etc.

REFERENCE SIGNS LIST 10, 30 Unmanned drifting substance monitoring buoy
11, 31 Buoy main body section 12 Mast
13 Sail
14 Drifting substance monitoring sensor
15 Brake plate
16 Thruster
17 Rudder
18 Keel
19 Solar panel

The invention claimed is:

1. An unmanned drifting substance monitoring buoy that is thrown into a water area where a drifting substance is present and that tracks and monitors the drifting substance, the unmanned drifting substance monitoring buoy comprising:
a detecting section that detects a relative location of the drifting substance on a water surface with respect to the unmanned drifting substance monitoring buoy;
a measuring section that measures directions and strengths of a wind and a tidal current;
a sail whose surface area and direction are adjustable; and
an adjusting section that adjusts the surface area and the direction of the sail by (i) inputting, as parameters to a Look-Up Table for calculating an amount of controlling the sail, the relative location of the drifting substance detected by the detecting section and the directions and the strengths of the wind and the tidal current measured by the measuring section, and (ii) calculating the amount of controlling the sail according to the input parameters.

2. The unmanned drifting substance monitoring buoy as set forth in claim 1, wherein oceanographic and/or meteorological data is analyzed, and the oceanographic and/or meteorological data thus analyzed is transmitted to a base station.

3. A drifting substance monitoring system that utilizes the unmanned drifting substance monitoring buoy as set forth in claim 1 or 2.

4. A drifting substance monitoring method for throwing an unmanned drifting substance monitoring buoy into a water area where a drifting substance is present and tracking and monitoring the drifting substance by the unmanned drifting substance monitoring buoy, the drifting substance monitoring method comprising the steps of:
detecting a relative location of the drifting substance on a water surface with respect to the unmanned drifting substance monitoring buoy;
measuring directions and strengths of a wind and a tidal current;
controlling the unmanned drifting substance monitoring buoy so as to track and follow the drifting substance by (i) inputting, as parameters to a Look-Up Table for calculating an amount of controlling a sail provided on the unmanned drifting substance monitoring buoy, the relative location of the drifting substance thus detected and the directions and the strengths of the wind and the tidal current thus measured, (ii) calculating the amount of controlling the sail according to the input parameters, and (iii) adjusting a surface area and a direction of the sail; and
transmitting information about location of the unmanned drifting substance monitoring buoy to a base station.

5. The drifting substance monitoring method as set forth in claim 4, wherein oceanographic and/or UM meteorological data is analyzed, and the oceanographic and/or meteorological data thus analyzed is transmitted to a base station.

* * * * *